(12) United States Patent
Johnson et al.

(10) Patent No.: US 8,727,682 B2
(45) Date of Patent: May 20, 2014

(54) SHOCK ABSORPTION AND RESTRAINT APPARATUS

(75) Inventors: Marc Steven Johnson, Murfreesboro, TN (US); Christopher Wayne Baker, Murfreesboro, TN (US); George C. Boyse, Rocklin, CA (US)

(73) Assignee: Premark Packaging LLC, Glenview, IL (US)

( * ) Notice: Subject to any disclaimer, the term of this patent is extended or adjusted under 35 U.S.C. 154(b) by 0 days.

(21) Appl. No.: 13/308,648

(22) Filed: Dec. 1, 2011

(65) Prior Publication Data
US 2012/0177458 A1     Jul. 12, 2012

Related U.S. Application Data

(60) Provisional application No. 61/431,163, filed on Jan. 10, 2011.

(51) Int. Cl.
*B61D 45/00*     (2006.01)

(52) U.S. Cl.
USPC .......................................................... 410/96

(58) Field of Classification Search
USPC .......................................... 410/96, 117, 118
See application file for complete search history.

(56) References Cited

U.S. PATENT DOCUMENTS

| | | |
|---|---|---|
| 276,017 A | 4/1883 | Foster |
| 292,336 A | 1/1884 | Madeira |
| 799,646 A | 9/1905 | Hart |
| 994,822 A | 6/1911 | Daly |
| 1,514,512 A | 11/1924 | Fisher |
| 1,519,901 A | 12/1924 | Boaz et al. |
| 2,075,711 A | 3/1937 | Gilley |
| 2,363,256 A | 11/1944 | Manning et al. |
| 2,620,748 A | 12/1952 | Shields |
| 2,763,380 A | 9/1956 | Danielson |
| 2,838,173 A | 6/1958 | Emery |
| 2,846,959 A | 8/1958 | Perry |
| 2,980,573 A | 4/1961 | Clifford |
| 3,067,699 A | 12/1962 | Fredriks |
| 3,091,348 A | 5/1963 | Neuhauser |
| 3,098,455 A | 7/1963 | McElroy et al. |
| 3,131,648 A | 5/1964 | Seger |
| 3,145,853 A | 8/1964 | Langenberg |
| 3,174,887 A | 3/1965 | Voelker |
| 3,220,583 A | 11/1965 | Robertson |
| 3,263,830 A | 8/1966 | Anderson |
| 3,275,131 A | 9/1966 | Erickson |
| 3,336,069 A | 8/1967 | Bayer et al. |
| 3,385,429 A | 5/1968 | Becker et al. |
| 3,405,659 A | 10/1968 | Hees |
| 3,462,027 A | 8/1969 | Puckhaber |

(Continued)

*Primary Examiner* — H Gutman
(74) *Attorney, Agent, or Firm* — Neal, Gerber & Eisenberg LLP

(57) ABSTRACT

A shock absorption and restraint apparatus including a plurality of co-acting cushioned pads which create a protective shock absorbing barrier for a load in a railroad car (or other shipping container) and a set of straps which are employed to restrain the cushioned pads and the load. In certain embodiments, the cushioned pads include one or more central or connector cushioned pads and one or more side or cooperating cushioned pads. In certain embodiments, the cushioned pads include strap engaging mechanisms which are configured to be engaged by the straps. The cushioned pads are preferably lightweight, easy to handle and install, recyclable, and readily reusable. In certain embodiments, the cushioned pads are configured, sized, and constructed in such a way to protect the specific load in the railroad car.

5 Claims, 13 Drawing Sheets

(56) References Cited

U.S. PATENT DOCUMENTS

| | | |
|---|---|---|
| 3,485,347 A | 12/1969 | McGill et al. |
| 3,575,403 A | 4/1971 | Hamel et al. |
| 3,581,674 A | 6/1971 | O'Leary |
| 3,581,675 A | 6/1971 | Kauffman |
| 3,593,671 A | 7/1971 | Bramlett |
| 3,612,301 A | 10/1971 | Peacock |
| 3,618,535 A | 11/1971 | Hees |
| 3,685,460 A | 8/1972 | Steele, Jr. et al. |
| 3,861,110 A | 1/1975 | Bartlett |
| 3,865,358 A | 2/1975 | Butters |
| 3,872,799 A | 3/1975 | Dousset |
| 3,958,516 A * | 5/1976 | Cheung .................. 410/115 |
| 4,007,309 A | 2/1977 | Sewell |
| 4,008,669 A | 2/1977 | Sumrell |
| 4,102,274 A | 7/1978 | Feary et al. |
| 4,247,237 A | 1/1981 | Brown |
| 4,264,251 A * | 4/1981 | Blatt .................. 410/100 |
| 4,372,717 A | 2/1983 | Sewell et al. |
| 4,386,881 A | 6/1983 | Liebel |
| 4,494,897 A | 1/1985 | Rogers |
| 4,516,891 A | 5/1985 | Wnuk et al. |
| 4,572,716 A | 2/1986 | West |
| 4,585,381 A | 4/1986 | Boyse |
| 4,702,311 A | 10/1987 | Bizard |
| 4,854,792 A | 8/1989 | Cottone |
| 4,865,889 A | 9/1989 | Boyse |
| 4,937,131 A | 6/1990 | Baldacci et al. |
| 5,057,350 A | 10/1991 | Gezels |
| 5,062,751 A | 11/1991 | Liebel |
| D327,433 S | 6/1992 | Sewell |
| 5,132,156 A | 7/1992 | Trassare, Jr. et al. |
| 5,139,842 A | 8/1992 | Sewell |
| 5,152,647 A | 10/1992 | Sewell |
| D331,014 S | 11/1992 | Sewell |
| 5,161,703 A | 11/1992 | Patton |
| 5,171,114 A | 12/1992 | Dunn |
| 5,181,814 A | 1/1993 | Woods et al. |
| 5,356,251 A | 10/1994 | Sisco et al. |
| 5,465,672 A | 11/1995 | Boyse et al. |
| 5,486,078 A | 1/1996 | Wise et al. |
| 5,636,951 A | 6/1997 | Long et al. |
| 5,678,968 A | 10/1997 | Bourgeois et al. |
| 5,807,046 A | 9/1998 | Onken |
| 5,846,038 A | 12/1998 | Bostelman |
| 5,848,865 A * | 12/1998 | Beals .................. 410/99 |
| 5,855,459 A | 1/1999 | Krier et al. |
| 5,899,331 A | 5/1999 | Warren, Jr. |
| 5,934,467 A | 8/1999 | Gilfert et al. |
| 5,947,812 A | 9/1999 | Henning et al. |
| 5,952,062 A | 9/1999 | Clark et al. |
| 5,993,310 A | 11/1999 | Onken |
| 6,030,158 A * | 2/2000 | Tatina et al. .................. 410/100 |
| 6,033,167 A | 3/2000 | Bourgeois |
| 6,116,044 A | 9/2000 | Gothier |
| 6,203,419 B1 | 3/2001 | Onken |
| 6,209,768 B1 * | 4/2001 | Boaz .................. 224/314 |
| 6,209,839 B1 | 4/2001 | O'Malley |
| 6,231,284 B1 | 5/2001 | Kordel |
| 6,305,128 B1 | 10/2001 | Horner et al. |
| 6,626,753 B2 | 9/2003 | Onken |
| 6,820,745 B1 | 11/2004 | Ono et al. |
| 6,827,534 B2 | 12/2004 | Onken |
| 6,945,865 B1 | 9/2005 | Turek |
| 6,989,184 B2 | 1/2006 | Duke et al. |
| D527,558 S | 9/2006 | Ng et al. |
| 7,195,435 B2 | 3/2007 | Clark |
| 7,249,921 B2 | 7/2007 | McMahon et al. |
| 7,290,970 B2 | 11/2007 | Deonarine |
| 7,311,483 B1 * | 12/2007 | Nudo .................. 410/41 |
| 7,431,547 B2 * | 10/2008 | Geary et al. .................. 410/41 |
| D617,642 S | 6/2010 | Jonzon et al. |
| 7,798,754 B2 | 9/2010 | Funk et al. |
| 7,934,894 B1 * | 5/2011 | Temple .................. 410/97 |
| 8,398,343 B1 * | 3/2013 | Henley et al. .................. 410/87 |
| 2005/0204707 A1 | 9/2005 | Duke et al. |
| 2006/0283142 A1 | 12/2006 | Varma et al. |
| 2008/0020172 A1 | 1/2008 | Boyse |
| 2008/0190129 A1 | 8/2008 | Clark et al. |
| 2008/0311334 A1 | 12/2008 | Kruelle et al. |
| 2008/0311335 A1 | 12/2008 | Kruelle et al. |
| 2009/0320514 A1 | 12/2009 | Clark et al. |
| 2009/0325476 A1 | 12/2009 | Clark |
| 2011/0011122 A1 | 1/2011 | Clark |

* cited by examiner

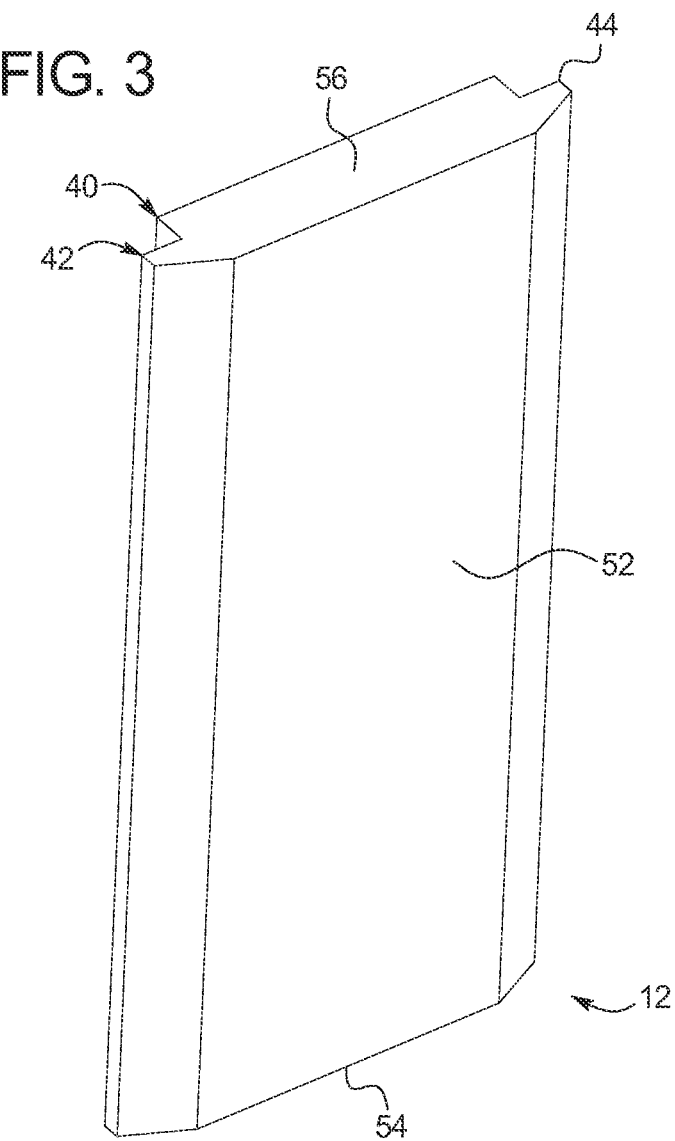
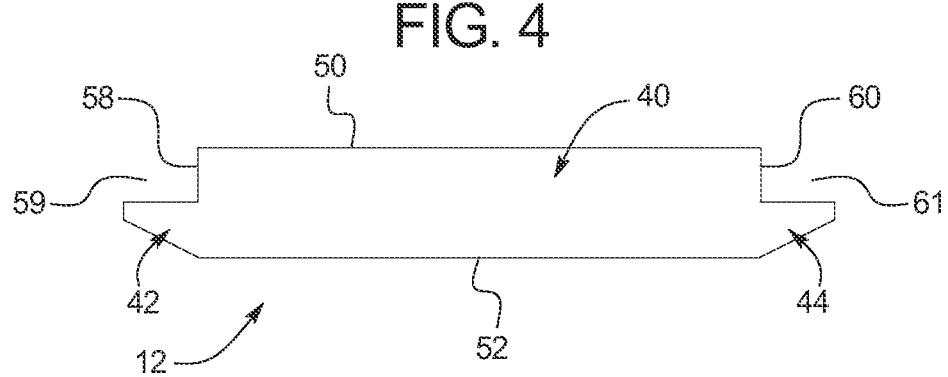

SHOCK ABSORPTION AND RESTRAINT APPARATUS

PRIORITY CLAIM

This application is a non-provisional of, claims the benefit of, and priority to U.S. Provisional Patent Application Ser. No. 61/431,163, filed Jan. 10, 2011, which is incorporated herein by reference.

BACKGROUND

Freight railroad cars with bulkhead door systems are well known. These railroad cars often need to be taken out of service to repair or replace broken or worn out bulkhead doors and/or related mechanisms. Taking these railroad cars out of service and this repair or replacement process is relatively expensive due to the lost revenue when these railroad cars are out of service and due to the actual cost of the repairs or replacements.

More specifically, bulkhead doors in freight railroad cars are typically large panels which are approximately 8 to 10 inches thick and generally fill the space from the floor to the ceiling and from one side wall to the opposite side wall of the railroad car. These panels move on geared tracks at the top of the railroad car and lock into slots on the floor of the railroad car to restrain the load (i.e., the goods, products, or items) stacked behind the bulkhead doors in the railroad car. The moving parts of these bulkhead door systems tend to wear out due to repeated use as well as due to the constant vibration during movement of the railroad cars. As the bulkhead door systems wear out, the bulkhead doors become harder to move, harder to lock in place, and harder to unlock. After worn to a certain degree, the bulkhead doors and/or related mechanisms must be repaired or replaced.

A further problem with bulkhead door systems in railroad cars is that such systems worked well when the railroad cars were loaded by hand, but tend to be less efficient or not work as well with more current loading processes (such as with loading processes using forklifts, slip sheets, and/or stretch wrap).

An additional problem with bulkhead door systems in railroad cars is their weight. The weight of the bulkhead door systems adds to the overall weight of the railroad cars and thus decreases fuel efficiency and increases overall transportation costs.

Due at least in part to these above described problems with known bulkhead door systems, the number of freight railroad cars with bulkhead door systems is declining.

Various attempts have been made to resolve these problems. Certain railroad cars without bulkhead doors have anchor clips attached to the interior sides of the walls of the railroad cars and adjacent to the doorway openings. These clips are used to secure straps that are in turn used to secure the loads in the railroad cars. Certain types of loads can be adequately secured using just these straps and clips. However, many types of loads can not be adequately secured and protected using just these straps and clips. Certain railroad car systems using materials such as wood and steel to create barrier walls that are secured with straps have also been designed and tested. These systems have problems in use in that they are heavy, costly, difficult to reuse (especially for different types of loads), are not readily recyclable, and decrease the overall fuel efficiency of the railroad cars. Additionally, these systems do not readily absorb forces from the loads while still protecting the loads.

Accordingly, there is a need for a better shock absorption and restraint apparatus for securing loads in railroad cars (and other shipping containers).

SUMMARY

The shock absorption and restraint apparatus of the present disclosure includes: (i) a set of co-acting cushioned pads which create a protective shock absorbing barrier for a load in a railroad car (or other shipping container), and (ii) a set of straps which are employed to restrain the cushioned pads and the load. In one embodiment of the present disclosure, each of the cushioned pads is a lightweight durable panel that provides the desired shock absorption and rigidity, and which is relatively easy to handle and install. The cushioned pads are preferably made of materials such as a foam material that is recyclable, but can be made from other materials as further discussed below. In certain embodiments, the cushioned pads are specifically configured to mate with or engage the specific loads and are preferably configured to be reused with those types of specific loads. In other embodiments, the cushioned pads are configured to engage different types of loads and are preferably configured to be reused with different types of loads.

In certain embodiments, the cushioned pads include a central or connector cushioned pad and a plurality of side or cooperating cushioned pads respectively positioned on the sides of the central cushioned pad. In other embodiments, the cushioned pads include a plurality of central or connector cushioned pads and a plurality of side or cooperating cushioned pads respectively positioned on the sides of the central or connector cushioned pads. In certain embodiments, the central or connector cushioned pad includes one or more shoulders (or other configurations which define one or more cooperating cushioned pad receipt areas) which overlap the side or cooperating cushioned pads to assist in securing the side or cooperating cushioned pads against the load. In certain embodiments, the central or connector cushioned pad is configured with a thicker body which holds the straps away from the side or cooperating cushioned pads to provide more tension on the cushioned pads and the load.

In various embodiments, the shock absorption and restraint apparatus of the present disclosure employs one of several different configurations to attach the straps to the cushioned pads to insure that the straps remain in the desired positions when securing the load and during transit when impacts absorbed by the railroad cars are transmitted to the load secured in the railroad car. For example, in certain embodiments, the cushioned pads include one or more strap engaging mechanisms or strap engagers which are each configured to engage and hold one of the straps. In one such embodiment, the strap engaging mechanisms or strap engagers are a plurality of non-metallic material loops attached to the outer or rear surface of the cushioned pad. Each of the plurality of loops attached to the outer or rear surfaces of the cushioned pads is configured and sized such that one of the straps can be threaded through the loop to minimize up and down movement of the straps relative to the pads. It should be appreciated that the number, size and placement of these loops will be based on the number, size and placement of the straps needed to hold the pads and the load. In other embodiments, the strap engaging mechanisms or strap engagers include a plurality of metal clips fastened to the cushioned pads which each hold one of the straps. In other embodiments, the strap engaging mechanisms or strap engagers include grooves or slots in the rear surface of the cushioned pads. The straps extend in the grooves and the side walls which define these grooves prevent movement of the straps. In further embodiments, the strap engaging mechanism or strap engager includes a plurality of strap receivers which are defined by walls of the cushioned pads, and in particular walls of the cushioned pad that define multiple holes or openings which are each configured to receive one of the straps. These holes or openings are configured such that the straps extend through the holes or openings to prevent the straps from substantial downward movement even if the pressure on the pads, and thus pressure on the straps, is reduced during movement of the railroad car and load being held by the pads. In other embodiments, the cushioned pads do not include any additional strap engaging mechanism or strap engagers which interact with the straps and the straps simply engage the outer or rear surfaces of the cushioned pads.

As mentioned above, in certain embodiments, the cushioned pads are configured, sized, and constructed in such a way to protect a specific load in the railroad car. For example, in certain embodiments of the present disclosure, the cushioned pads are made from materials with selected densities to match or correspond with the type of load in the railroad car. That is, the present disclosure contemplates employing cushioned pads having relatively heavier densities to work with larger items and fewer straps, and cushioned pads having relatively lower densities to work with smaller items and more straps. In other examples, in certain embodiments of the present disclosure, the cushioned pads are shaped specifically to engage a specific load. In certain embodiments, the cushioned pads are configured to fold or bend where needed to wrap around the load and evenly distribute the securing forces of the straps securing the load.

Additional features and advantages are described herein, and will be apparent from the following Detailed Description and the figures.

BRIEF DESCRIPTION OF THE FIGURES

FIG. 3 is an enlarged perspective view of the central or connector cushioned pad of the example embodiment of the present disclosure in FIG. 1.

FIG. 4 is an enlarged top view of the central or connector cushioned pad of the example embodiment of the present disclosure in FIG. 1.

DETAILED DESCRIPTION OF EXAMPLE EMBODIMENTS

Figure 1:
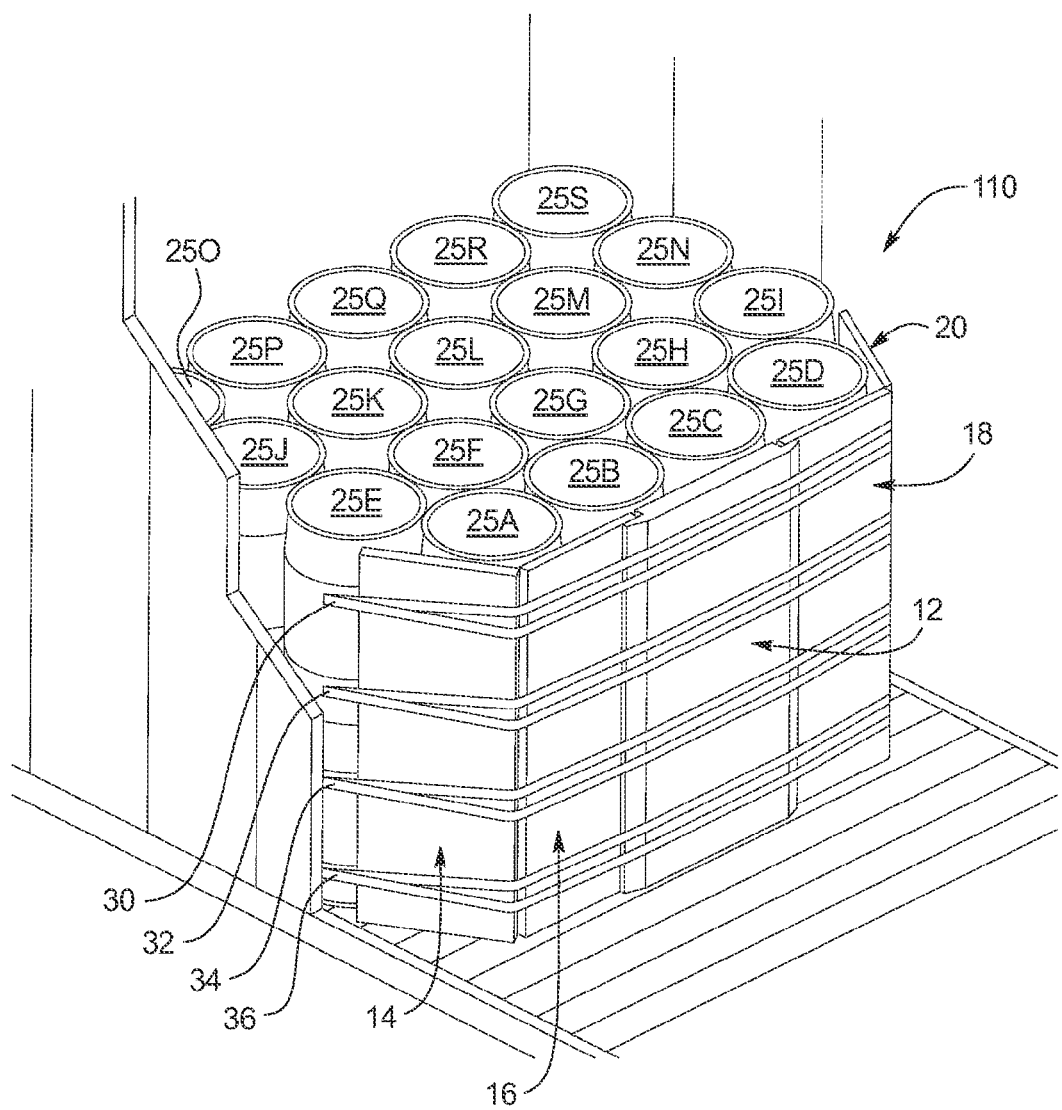
FIG. 1 is a fragmentary perspective view of a plurality of cylindrical drums positioned in a railroad car, and a plurality of cushioned pads and straps of one example embodiment of the present disclosure holding the cylindrical drums in place.
Figure 2:
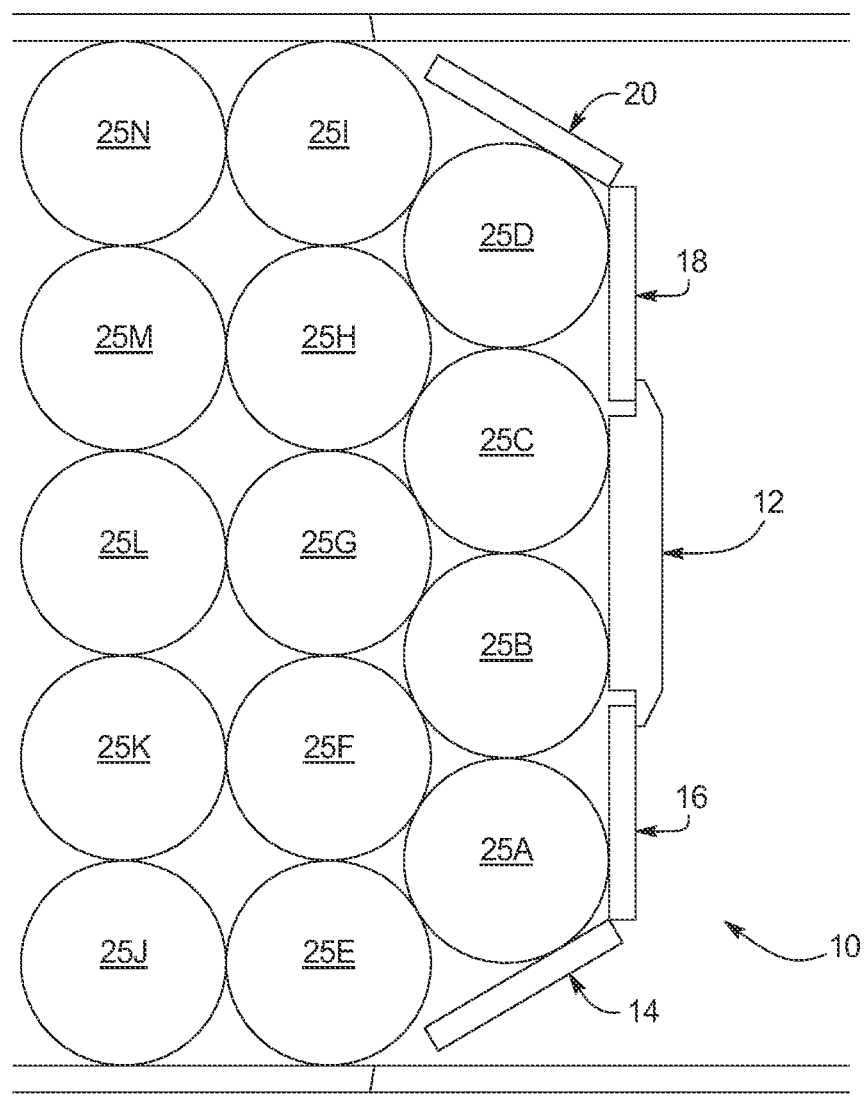
FIG. 2 is a fragmentary top view of the plurality of cylindrical drums in the railroad car being held in place by the cushioned pads of the embodiment of the present disclosure illustrated in FIG. 1.

Various example embodiments of the shock absorption and restraint apparatus of the present disclosure are described below and illustrated in the accompanying figures. For brevity, the shock absorption and restraint apparatus of the present disclosure may sometimes be referred to herein as the shock absorption apparatus, the restraint apparatus, or simply the apparatus. Generally, the shock absorption and restraint apparatus of the present disclosure includes: (i) a plurality of co-acting cushioned pads which create a protective shock absorbing barrier for a load (such as goods, products, or other items) in a railroad car (or other shipping container), and (ii) a set of straps which are employed to restrain the cushioned pads and the load.

The cushioned pads of the shock absorption and restraint apparatus are lightweight durable panels that provide the desired shock absorption and rigidity. The cushioned pads are preferably made of materials such as a foam material that is recyclable, although they may be made from other suitable materials such as plastic, paper, and corrugated materials. The cushioned pads and straps are easy to handle and install. The cushioned pads and straps do not significantly increase the overall weight of the railroad cars and thus do not significantly decrease fuel efficiency or increase overall transportation costs.

The cushioned pads do not tend to wear out like the bulkhead door systems as described above due to repeated use or the constant vibration during movement of the railroad cars. Additionally, when the cushioned pads do wear out or are otherwise damaged or destroyed, the cushioned pads can be easily, quickly, and relatively inexpensively repaired or replaced without taking the railroad car out of service. Further, the cushioned pads eliminate the need for the tracks associated with bulkhead doors and additionally work well with current loading processes (such as with loading processes using forklifts, slip sheets, and/or stretch wrap).

As evident from the example embodiments discussed below, in certain embodiments, the cushioned pads are specifically configured to mate with or engage the specific loads and are preferably configured to be reused with that type of specific loads. In other embodiments, the cushioned pads are configured to engage different types of loads and are preferably configured to be reused with different types of loads.

Turning now to the figures and particularly to FIGS. 1, 2, 3, and 4, one example embodiment of the shock absorption and restraint apparatus of the present disclosure is illustrated and generally indicated by numeral 10. In this example embodiment, the apparatus 10 includes a plurality of cushioned pads 12, 14, 16, 18, and 20 configured to engage, secure and protect the load and a plurality of straps 30, 32, 34, and 36 configured to be connected to the railroad car and to engage the cushioned pads 12, 14, 16, 18 and 20 which engage the load. In this example, the load includes a plurality of cylindrical drums labeled 25A, 25B, 25C, 25D, 25E, 25F, 25G, 25H, 25I, 25J, 25K, 25L, 25M, 25N, 25O, 25P, 25Q, 25R, and 25S. It should be appreciated that two or more of the pads may be connected as further discussed below. For example, pads 14 and 16 may be connected by a suitable pad connector such as hinge (not shown), and pads 18 and 20 may be connected by a suitable pad connector such as hinge (not shown). These additional connections add strength and rigidity to the cushioned pads. It should also be appreciated that two or more of the pads can be replaced by a single pad. For example, pads 18 and 20 may be replaced by a single pad with a fold or bend. These alternative embodiments are further discussed below.

More specifically, the plurality of cushioned pads includes a central or connector cushioned pad 12 and a plurality of side or cooperating cushioned pads 14, 16, 18, and 20 respectively positioned adjacent to and/or on each side of the central cushioned pad 12. These cushioned pads 12, 14, 16, 18, and 20 are configured to be positioned between the load and the straps to secure the load and to protect the load by absorbing forces from movements of the load during transit. As best seen in FIGS. 3 and 4, in the illustrated example embodiment, the central or connector cushioned pad 12 generally includes an elongated body 40, and first and second elongated shoulders 42 and 44 extending from opposite sides of the body 40. More specifically, the body 40 includes a front or load engaging surface 50, a rear or strap engaging surface 52, a bottom surface or edge 54, a top surface or edge 56, a first or left side surface or edge 58, and a second or right side surface or edge 60. The first shoulder 42 includes a front surface or side pad engaging surface, a rear or strap engaging surface, a bottom surface or edge, a top surface or edge, a first or free side surface or edge, and a second or connector surface or edge connected to the left edge 58 of the body 40. Likewise, the second shoulder 44 includes a front surface or side pad engaging surface, a rear or strap engaging surface, a bottom surface or edge, a top surface or edge, a first or free side surface or edge, and a second or connector surface or edge connected to the right edge 60 of the body 40. The first shoulder 42 and the edge 58 of the body 40 form a first elongated pad receipt area 59 configured to receive a side of cooperating pad 16. The second shoulder 44 and the edge 60 of the body 40 form a second elongated pad receipt area 61 configured to receive a side of cooperating pad 18. These shoulders overlap the side or cooperating cushioned pads 16 and 18 to assist in securing these side or cooperating cushioned pads against the load. This central or connector cushioned pad is configured to hold the straps away from the inner sides of the side or cooperating cushioned pads 16 and 18 to provide more tension on all of the cushioned pads and the load as generally illustrated in FIG. 1.

It should be appreciated that while in this illustrated embodiment, each of the shoulders is an elongated member, each of the shoulders may include one or more separate sections. It should also be appreciated that the shape and size of these shoulders can vary in accordance with the present disclosure and in part based on the load and size and shape of the cushioned pads.

Each of the cooperating pads 14, 16, 18, and 20 includes an elongated body having a front or load engaging surface, a rear or strap engaging surface, a bottom surface or edge, a top surface or edge, a first or left side surface or edge, and a second or right side surface or edge. The cooperating pads 14, 16, 18, and 20 are generally the same size and configuration; however, it should be appreciated that based on the load, the number, the size, and the configuration of these cooperating pads may vary.

As mentioned above, in this illustrated embodiment, each of the cushioned pads 12, 14, 16, 18, and 20 is made from a suitable foam material. In the preferred embodiment, the exterior surface of each cushioned pad is smooth to prevent rips or tears in the cushioned pads and to prevent damage to the load. The foam material is configured to be compressed to absorb forces from the loads. The thickness of the foam material is in part selected based on the desired absorption characteristics, which is based in part on the load. Additionally, as mentioned above, the foam material has a selected density to control the force absorption level. The present disclosure contemplates employing cushioned pads made of a foam material having a relatively heavy density for engaging larger items and cushioned pads made of a foam material having a relatively lower density for engaging smaller items. The present disclosure also contemplates employing a relatively low number or quantity of straps with heavy density cushioned pads for engaging larger items and a relatively higher number of straps with low density cushioned pads for engaging smaller items. The present disclosure also contemplates that the material of the pads may be selected based on the desired strength, cost and desired functionality (such as flexibility, rigidity, and shock absorption properties).

In this illustrated embodiment, the shock absorption and restraint apparatus 10 also includes a plurality of spaced apart straps 30, 32, 34, and 36 which are configured to engage the connector pad 12 and the cooperating pads 14, 16, 18, and 20 to securely hold those pads and the load. Although not shown, the ends of the straps 30, 32, 34, and 36 are suitably connected to the interior walls or clips on the interior walls of the railroad car. It should be appreciated that while four straps are shown in this illustrated embodiment, the number or quantity, size, configuration of the straps may vary. For instance, in the illustrated embodiment, each strap includes two adjacent sections; however, it should be appreciated that each strap may include one section, or more than two sections. In this illustrated embodiment, the straps are made from a relatively strong flexible nylon material, but the straps can be made from other suitable materials as further discussed below.

It should be appreciated that the number and placement of the cushioned pads relative to the load (such as the drums 25A to 25S in this example) will depend on the number or quantity, shape, size, and weight of the products which make up the load. Additionally, the placement of the cushioned pads and particularly the placement of the cooperating pads can vary based on the positions and number or quantity of products of the load. For example, if drums 25A and 25D were not in the railroad car, the cooperating pads 14, 16, 18, and 20 can easily be positioned to account for this alternative arrangement of the remaining drums.

It should be appreciated that in this example embodiment, the cushioned pads do not include any strap engaging mechanism or strap engagers which interact with the straps, and the straps simply engage the outer or rear surfaces of the cushioned pads.

Figure 5:
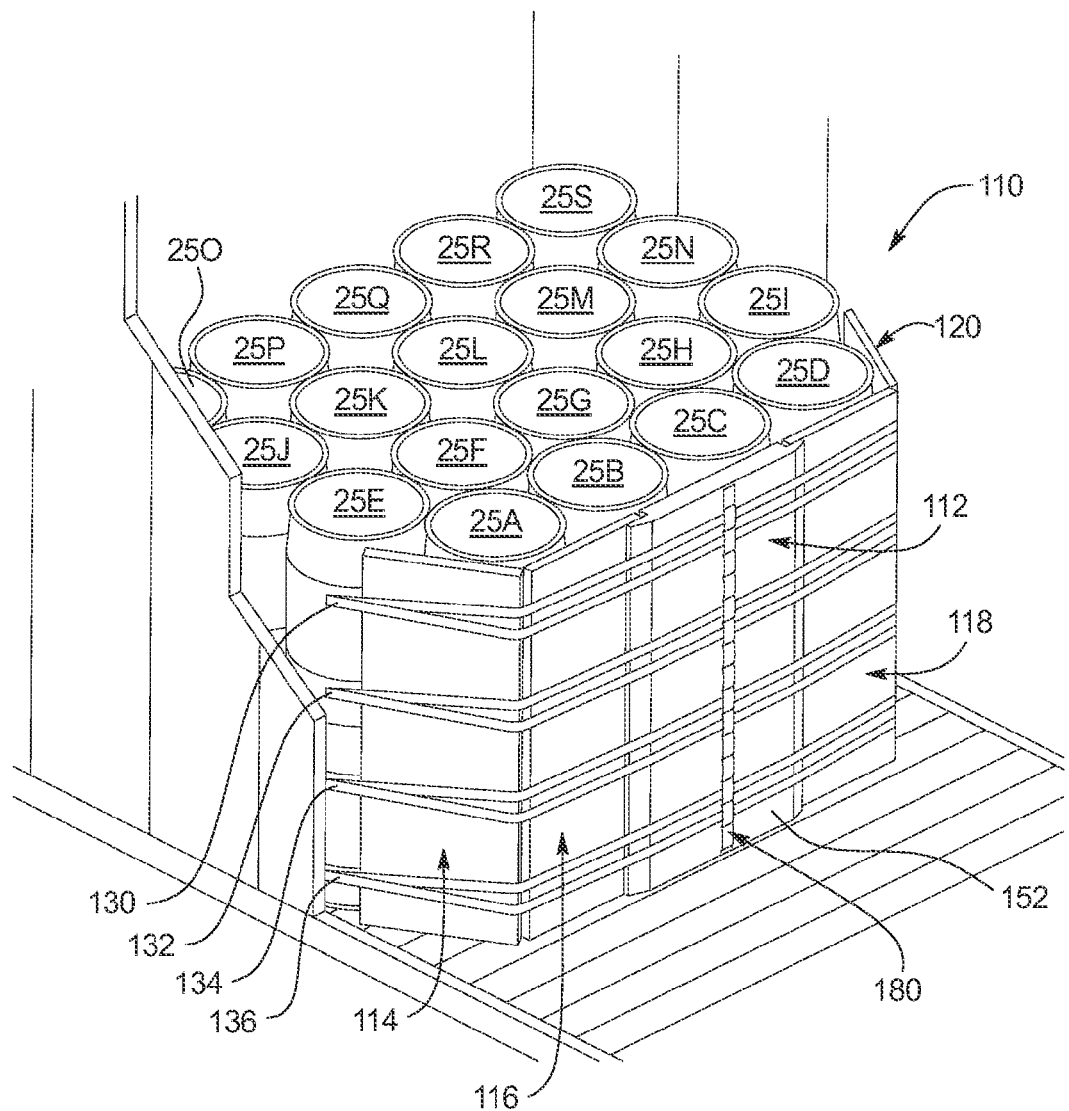
FIG. 5 is a fragmentary perspective view of a plurality of cylindrical drums positioned in a railroad car, and a plurality of cushioned pads and straps of another example embodiment of the present disclosure holding the cylindrical drums in place, where the central cushioned pad has strap engagers which hold the straps in place.

Turning now to FIG. 5, another example embodiment of the shock absorption and restraint apparatus of the present disclosure is illustrated and generally indicated by numeral 110. In this example embodiment, the apparatus 110 includes a plurality of cushioned pads 112, 114, 116, 118, and 120 configured to engage, secure and protect the load and a plurality of straps 130, 132, 134, and 136, configured to be connected to the walls of the railroad car and to engage the cushioned pads 112, 114, 116, 118 and 120 which engage the load. In this example, the load includes a plurality of cylindrical drums labeled 25A to 25S.

In this embodiment, the connector pad 112 includes a strap engager 180 attached to and extending along a central or substantially central vertical or substantially vertical line along the rear or strap engaging surface 152 of the connector pad 112. The strap engager 180 includes a plurality of spaced apart strap receivers, strap holders, or strap receiving loops through which the sections of the straps 130, 132, 134, and 136 are respectively threaded. This strap engager 180 assist in maintaining the desired positions of the straps relative to the connector pad 112 during transit of the railroad car. It should be appreciated that the configuration of the strap receivers may vary in accordance with the present disclosure. In this illustrated embodiment, the strap engager is made from a relatively non-metallic strong flexible nylon material suitably attached to the connector pad 112, although the strap engager can be made from other materials as further discussed below.

In other embodiments, the strap engaging mechanisms or strap engagers include a plurality of clips such as metal clips fastened to one or more of the cushioned pads which each hold one of the straps. In other embodiments, the strap engaging mechanisms or strap engagers include grooves or slots in the rear surface of the cushioned pads. The straps extend in the grooves and the side walls which define these grooves prevent movement of the straps. In other embodiments, as further discussed below, the strap engaging mechanisms or strap engagers include interior walls or sections of the cushioned pads which define openings or holes in the cushioned pad(s).

It should also be appreciated that in other embodiments, one or more of the other cushioned pads 114, 116, 118, and 120 may additionally each include one or more strap engagers. Additionally, in other embodiments, one or more of the other cushioned pads 114, 116, 118, and 120 may each include one or more strap engagers instead of the connector pad 112.

Figure 6:
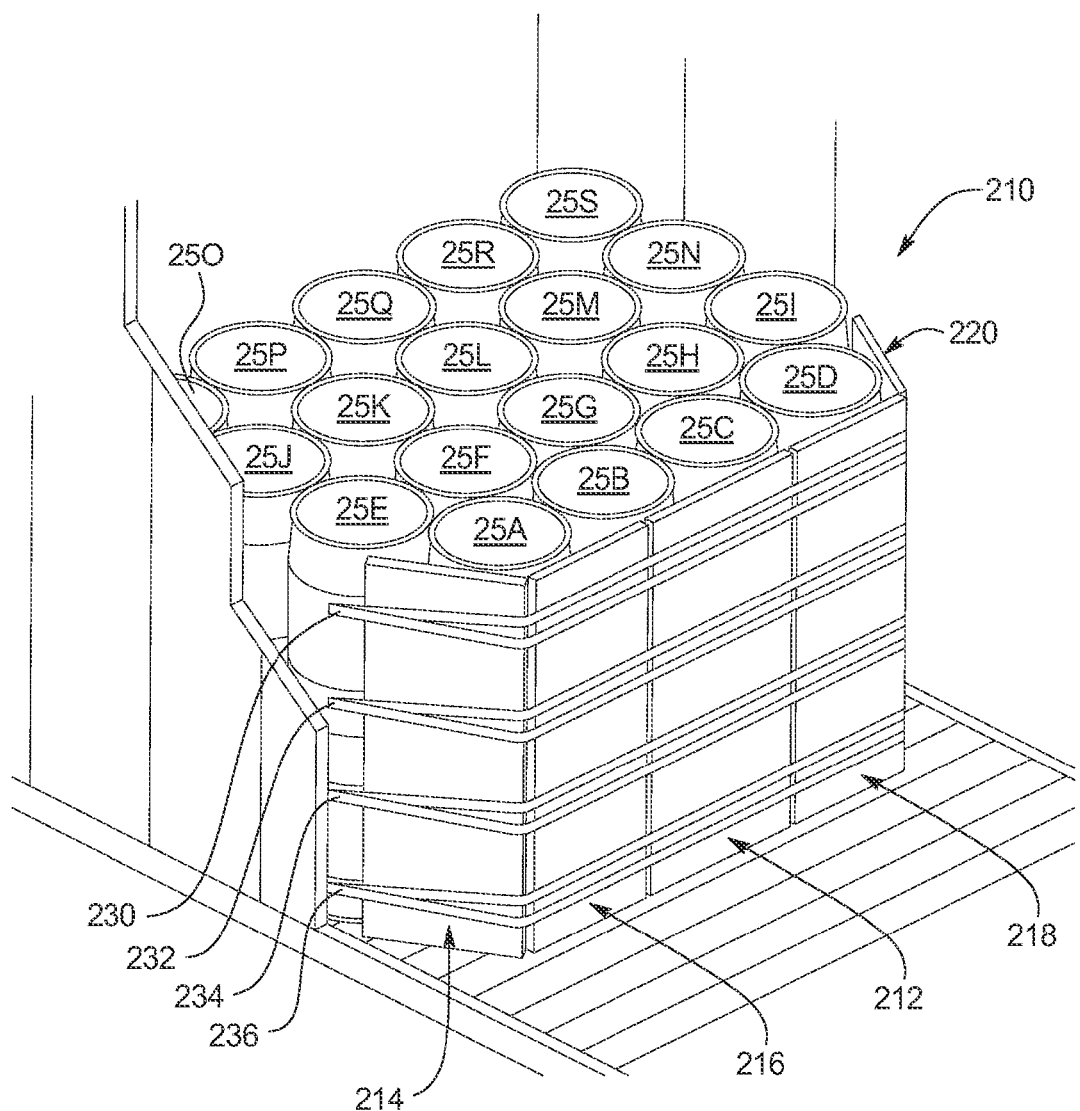
FIG. 6 is a fragmentary perspective view of a plurality of cylindrical drums positioned in a railroad car, and a plurality of cushioned pads and straps of another example embodiment of the present disclosure holding the cylindrical drums in place.

Turning now to FIG. 6, another example embodiment of the shock absorption and restraint apparatus of the present disclosure is illustrated and generally indicated by numeral 210. In this example embodiment, the apparatus 210 includes a plurality of cushioned pads 212, 214, 216, 218, and 220 configured to engage, secure and protect the load and a plurality of straps 230, 232, 234, and 236 configured to be connected to the railroad car and to engage the cushioned pads 212, 214, 216, 218, and 220 which engage the load. In this example, the load includes a plurality of cylindrical drums labeled 25A to 25S. In this embodiment, the cushioned pad 212 does not include any shoulders and all of the cushioned pads 212, 214, 216, 218, and 220 are identical.

In this example embodiment, the cushioned pads do not include any strap engaging mechanisms or strap engagers which interact with the straps, and the straps simply engage the outer or rear surfaces of the cushioned pads. Additionally, in this example embodiment, the straps engage the outside surface of each of the cushioned pads. It should be appreciated that this embodiment can include strap engagers which will help prevent the movement of any of the pads 212, 214, 216, 218, and 220.

Figure 7:
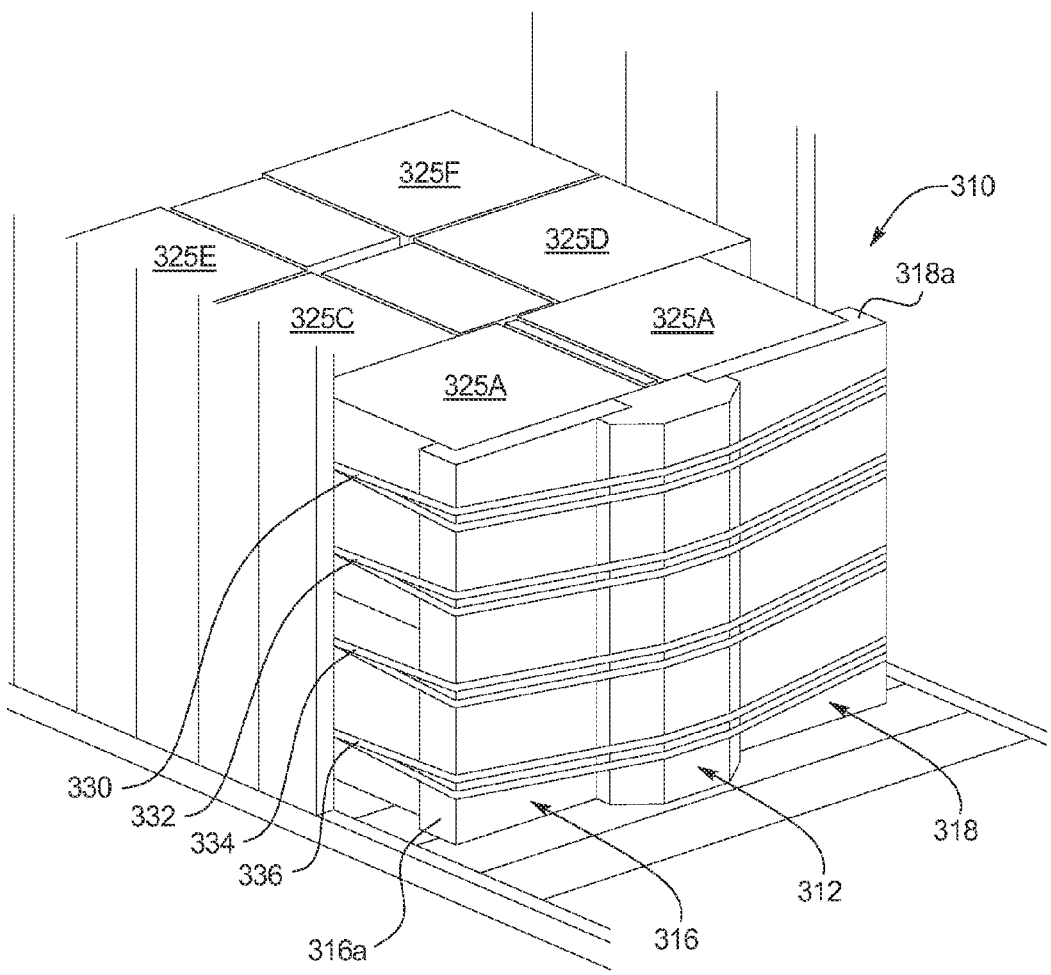
FIG. 7 is a fragmentary perspective view of a plurality of boxes positioned in a railroad car, and a plurality of cushioned pads and straps of another example embodiment of the present disclosure holding the boxes in place.
Figure 8:
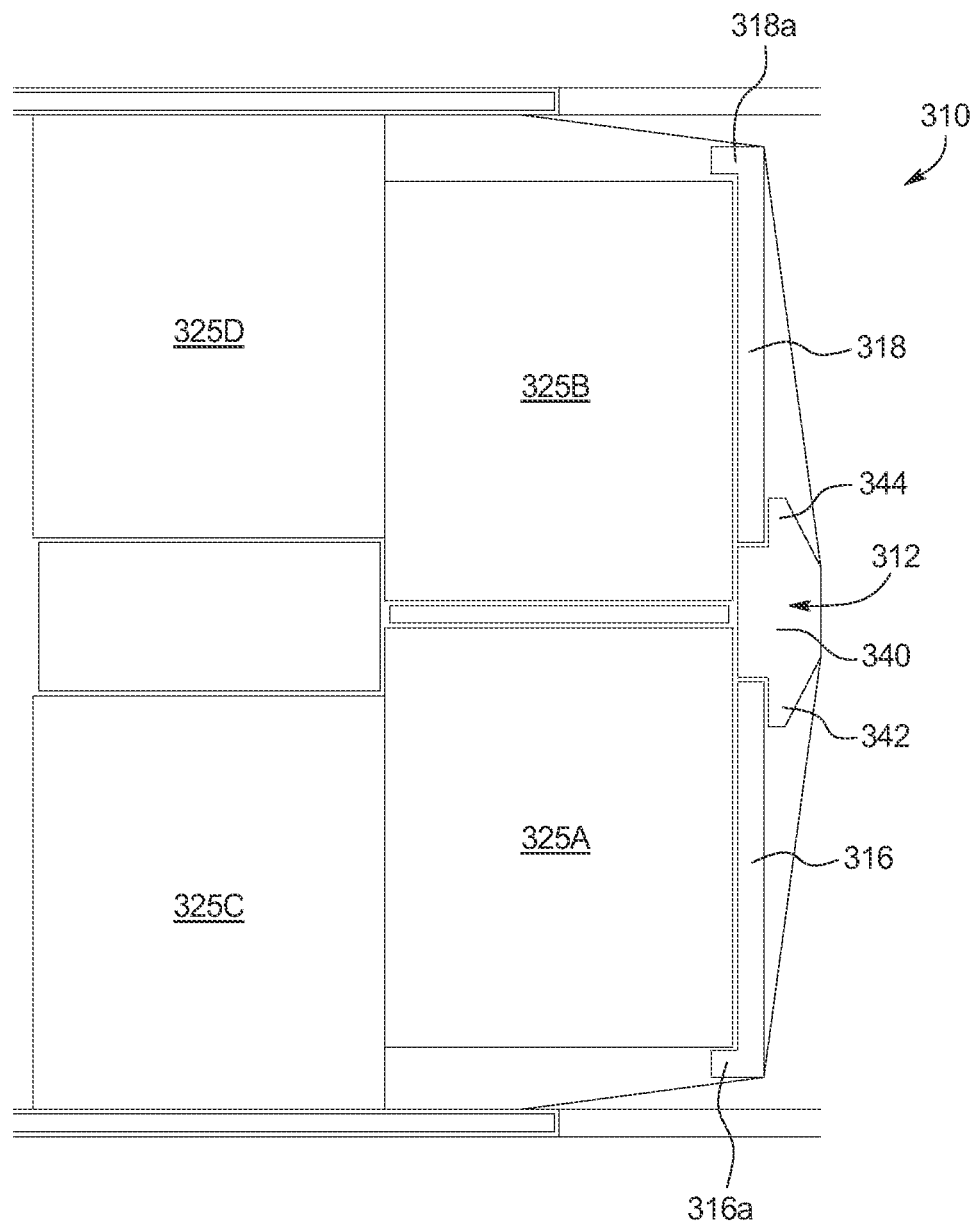
FIG. 8 is a fragmentary top view of the plurality of boxes in the railroad car being held in place by the cushioned pads and straps of the embodiment of the present disclosure illustrated in FIG. 7.

Turning now to FIGS. 7 and 8, another example embodiment of the shock absorption and restraint apparatus of the present disclosure is illustrated and generally indicated by numeral 310. In this example embodiment, the apparatus 310 includes a plurality of cushioned pads 312, 316, and 318 configured to engage, secure and protect the load and a plurality of straps 330, 332, 334, and 336, configured to be connected to the railroad car and to engage the cushioned pads 312, 316, and 318 which engage the load. In this example, the load includes a plurality of boxes labeled 325A, 325B, 325C, 325D, 325E, and 325F. In this embodiment, the connector cushioned pad 312 generally includes an elongated body 340, and first and second elongated shoulders 342 and 344 respectively extending from opposite sides of the body 40. More specifically, the body 340 (which is wider than the body 40 of pad 12) includes a front or load engaging surface, a rear or strap engaging surface, a bottom surface or edge, a top surface or edge, a first or left side surface or edge, and a second or right side surface or edge. The first shoulder 342 includes a front surface or side pad engaging surface, a rear or strap engaging surface, a bottom surface or edge, a top surface or edge, a first or free side surface or edge, and a second or connector surface or edge connected to the left edge of the body 340. Likewise, the second shoulder 344 includes a front surface or side pad engaging surface, a rear or strap engaging surface, a bottom surface or edge, a top surface or edge, a first or free side surface or edge, and a second or connector surface or edge connected to the right edge of the body 340. The first shoulder 342 and the edge of the body 340 form a first elongated pad receipt area configured to receive a side of the side cooperating pad 316. The second shoulder 344 and the edge of the body 340 form a second elongated pad receipt area configured to receive a side of the side cooperating pad 318. These shoulders overlap the side or cooperating cushioned pads 316 and 318 to assist in securing these side or cooperating cushioned pads against the load. This central or connector cushioned pad 312 with the thicker body is also configured to better hold the straps away from the inner sides of the side or cooperating cushioned pads 316 and 318 to provide more tension on the central pad 312 and the far ends of the cooperating cushioned pads 316 and 318 and the load as generally illustrated in FIGS. 7 and 8.

Each of the cooperating pads 316 and 318 includes an elongated body having a front or load engaging surface, a rear or strap engaging surface, a bottom surface or edge, a top surface or edge, a first or left side surface or edge, and a second or right side surface or edge. The cooperating pad 316 includes a load engagement arm 316a connected to the left edge of the body of cooperating pad 316, and the cooperating pad 318 includes a load engagement arm 318a connected to the right edge of the body of cooperating pad 318. These load engagement arms are specifically configured to engage, secure and protect the boxes 325A and 325B. As seen in FIGS. 7 and 8, these cooperating cushioned pads are an example of pads that are specifically configured for the load and specifically the boxes.

Figure 9:
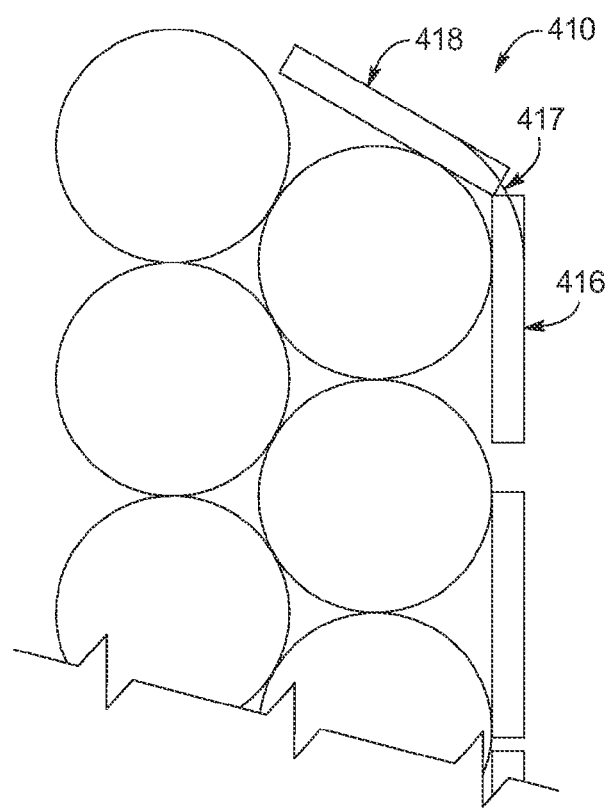
FIG. 9 is a fragmentary top view of a plurality of cylindrical drums positioned in a railroad car, and a plurality of cushioned pads of another example embodiment of the present disclosure holding the cylindrical drums in place, where two of the cooperating cushioned pads are connected.

Turning now to FIG. 9, another example embodiment of the shock absorption and restraint apparatus of the present disclosure is illustrated and generally indicated by numeral 410. In this example embodiment, the apparatus 410 includes two cooperating cushioned pads 416 and 418 which are connected by a hinge 417. The hinge may be any suitable type of hinge which connects these pads. It should be appreciated that the connector pad is not illustrated in FIG. 9, but that this embodiment can include a connector pad.

Figure 10:
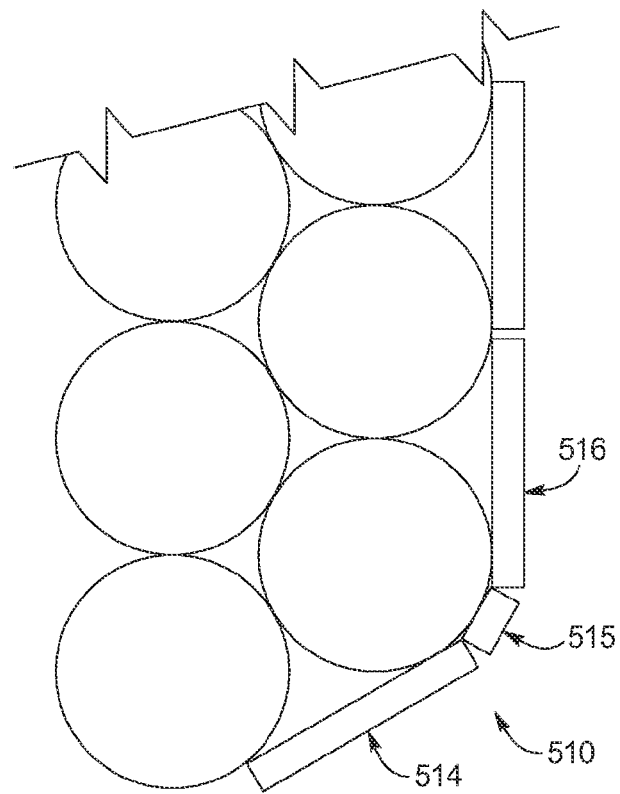
FIG. 10 is a fragmentary top view of a plurality of cylindrical drums positioned in a railroad car, and a plurality of cushioned pads of another example embodiment of the present disclosure holding the cylindrical drums in place, where three of the cooperating cushioned pads are connected.

Turning now to FIG. 10, another example embodiment of the shock absorption and restraint apparatus of the present disclosure is illustrated and generally indicated by numeral 510. In this example embodiment, the apparatus 510 includes three connected cooperating cushioned pads 514, 515, and 516 which are connected by suitable hinges. In this example embodiment cushioned pad 515 is considerably smaller than pads 514 and 516. This embodiment shows that this added pad 515 in the hinge area can function as a reinforcement for certain types of loads. It should be appreciated that the connector pad is not illustrated in FIG. 10, but that this embodiment can include a connector pad.

Figure 11:
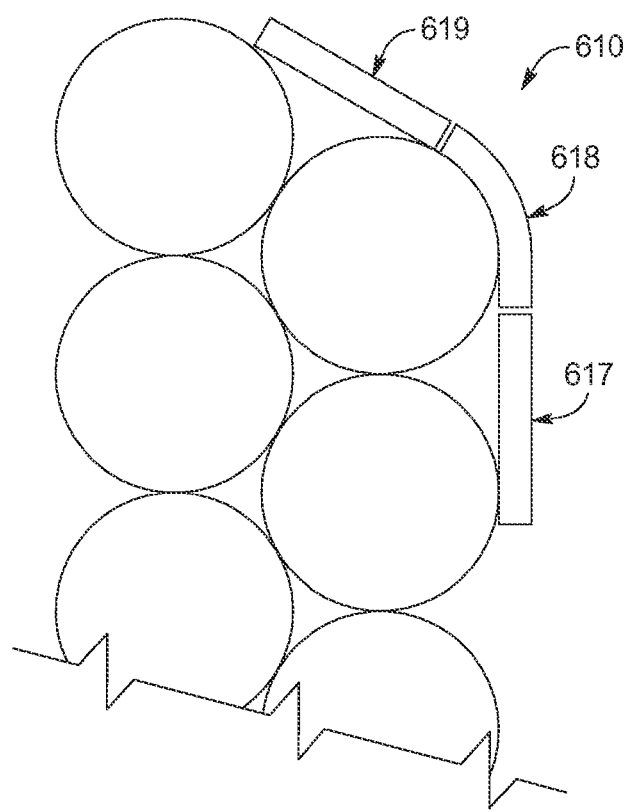
FIG. 11 is a fragmentary top view of a plurality of cylindrical drums positioned in a railroad car, and a plurality of cushioned pads of another example embodiment of the present disclosure holding the cylindrical drums in place, where one of the cooperating cushioned pads is curved to correspond to the shape of one of the drums.

Turning now to FIG. 11, another example embodiment of the shock absorption and restraint apparatus of the present disclosure is illustrated and generally indicated by numeral 610. In this example embodiment, the apparatus 610 includes a cooperating cushioned pad 618 which is curved to correspond to the shape of one of the drums and which functions with cushioned pads 617 and 619 (among other pads) to maintain the load. It should be appreciated that the connector pad is not illustrated in FIG. 11, but that this embodiment can include a connector pad.

Figure 12:
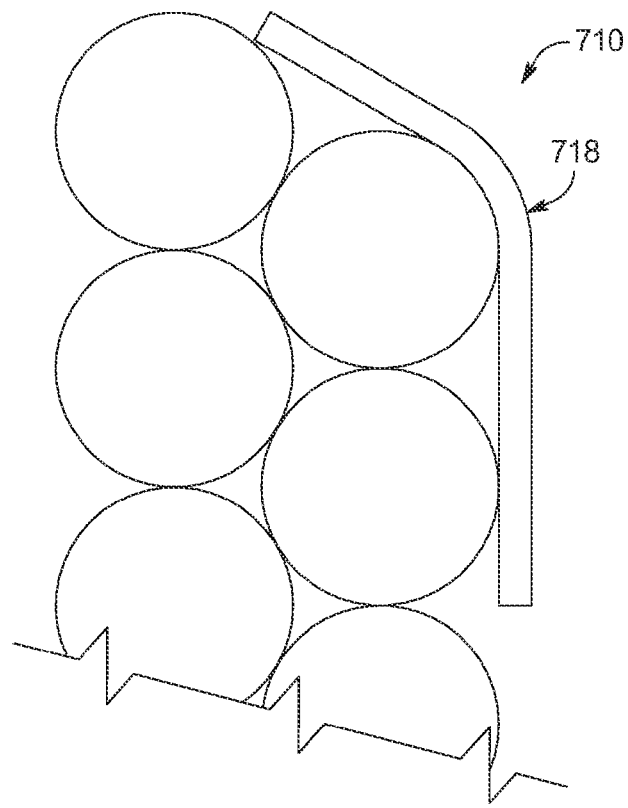
FIG. 12 is a fragmentary top view of a plurality of cylindrical drums positioned in a railroad car, and a cooperating cushioned pad of another example embodiment of the present disclosure holding the cylindrical drums in place, where the cooperating cushioned pad is curved to correspond to the shape of one of the drums and which is sized to engage adjacent drums.

Turning now to FIG. 12, another example embodiment of the shock absorption and restraint apparatus of the present disclosure is illustrated and generally indicated by numeral 710. In this example embodiment, the apparatus 710 includes a cooperating cushioned pad 718 which is curved to correspond to one of the drums and which is sized to engage two of the other drums. It should be appreciated that the connector pad is not illustrated in FIG. 12, but that this embodiment can include a connector pad.

Figure 13:
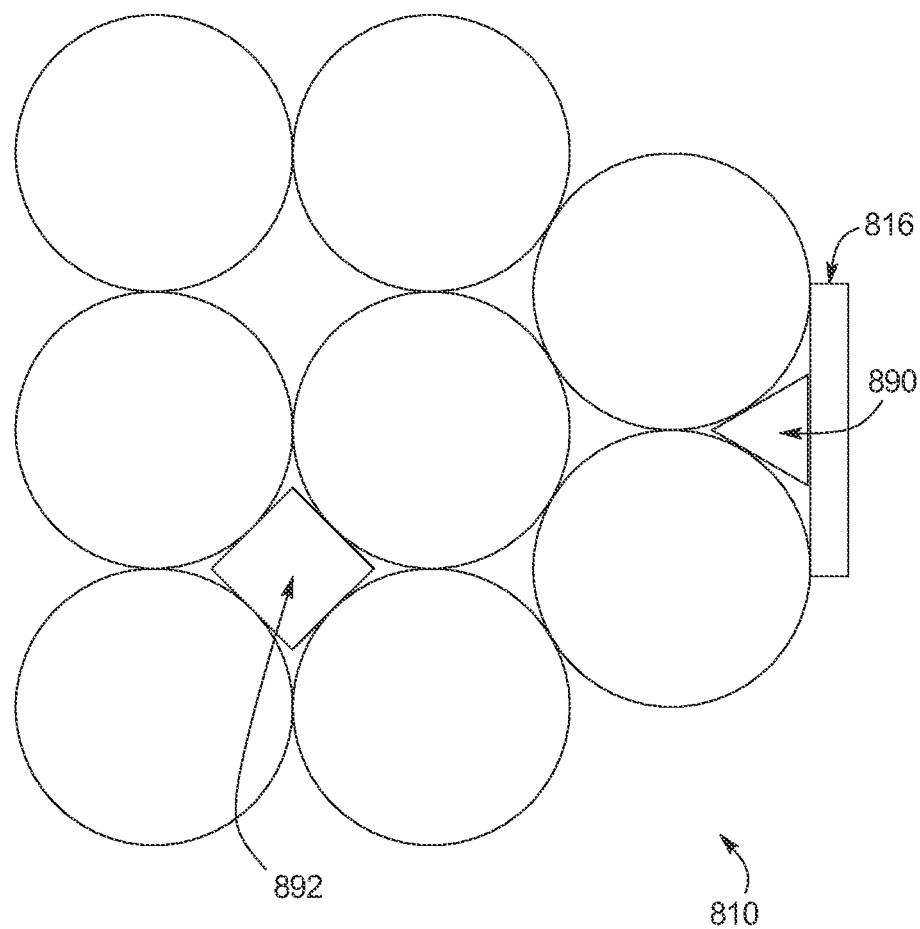
FIG. 13 is a fragmentary top view of a plurality of cylindrical drums positioned in a railroad car, and a cushioned pad of another example embodiment of the present disclosure holding the cylindrical drums in place, and a wedge-shaped filler pad in engagement with the cooperating cushioned pad for engaging two of the drums, and a rectangular shaped filler pad between four of the drums.

Turning now to FIG. 13, another example embodiment of the shock absorption and restraint apparatus of the present disclosure is illustrated and generally indicated by numeral 810. In this example embodiment, the apparatus 810 includes a plurality of filler pads which co-act with the cushioned pads. Specifically, in this illustrated embodiment a wedge-shaped filler pad 890 is in engagement with the cushioned pad 816 for engaging two of the drums, and a rectangular shaped filler pad 892 is between four of the drums. It should be appreciated that the connector pad is not illustrated in FIG. 13, but that this embodiment can include a connector pad. It should be appreciated that any suitable filler pads can be employed with the cushioned pads of the present disclosure. In certain embodiments, these filler pads are attached to the cushioned pads.

Figure 14:
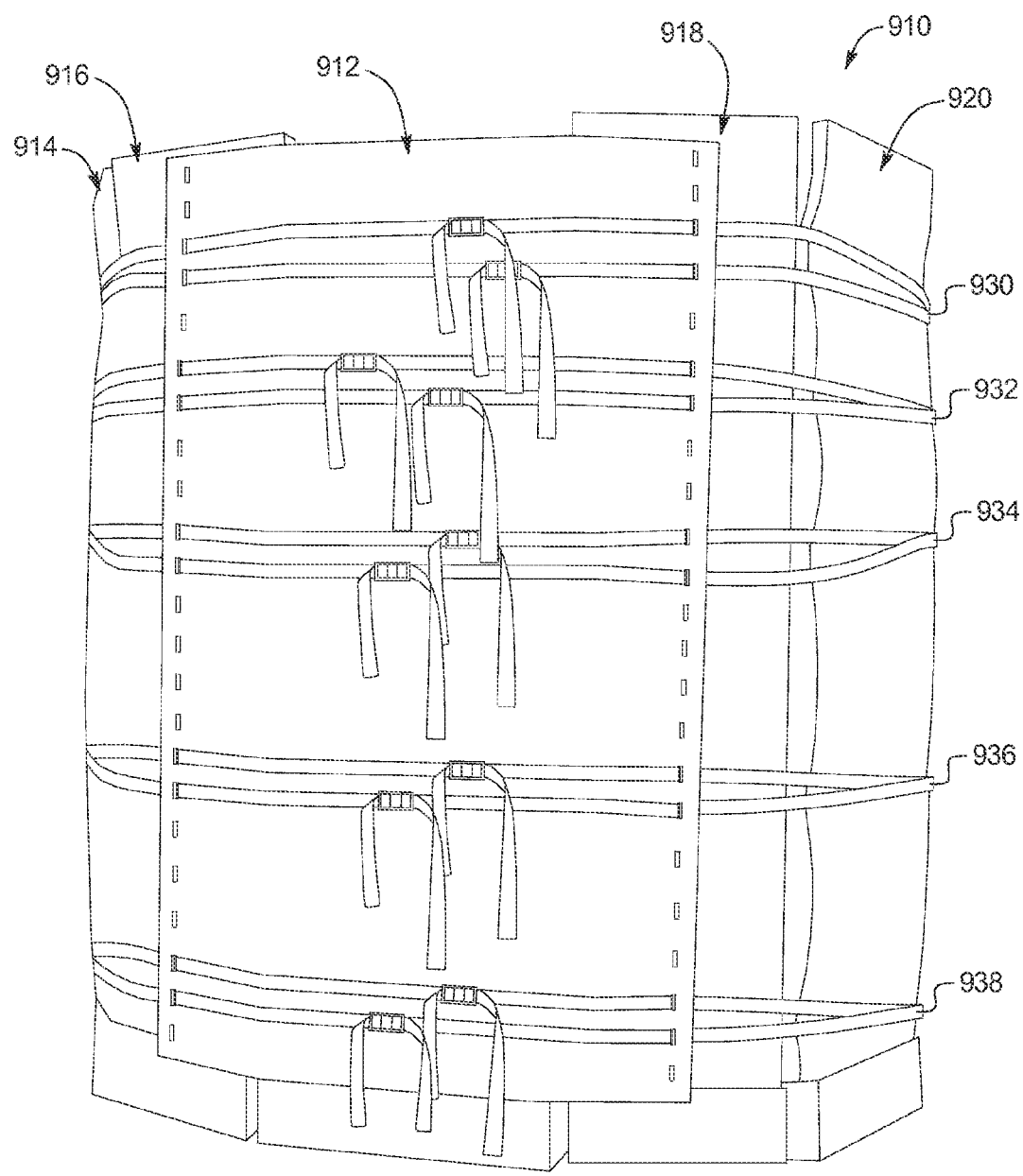
FIG. 14 is front perspective view of a plurality of cushioned pads and straps of another example embodiment of the present disclosure, wherein the straps extend through one of the cushioned pads, and wherein the cushioned pads are positioned firmly against the load.

Turning now to FIG. 14, another example embodiment of the shock absorption and restraint apparatus of the present disclosure is illustrated and generally indicated by numeral 910. In this example embodiment, the apparatus 910 includes a connecting cushioned pad 912, cooperating cushioned pads 914, 916, 918, and 920, and straps 930, 932, 934, 936, and 938. Connecting cushioned pad 912 includes strap engaging mechanisms or strap engagers in the form of two series of vertically extending aligned spaced apart strap receivers which each extend adjacent to each side of the cushioned pad 912. Each strap receiver in each series includes the walls of the cushioned pad which define an opening or hole through which one of the respective straps can extend through. The straps are threaded through the appropriate openings or holes on each side of the connecting pad 912 as generally illustrated in FIG. 14 to prevent the straps from falling down when the load shifts during movement of the freight railroad car and less pressure is on the cushioned pads as further illustrated in FIG. 15.

Figure 15:
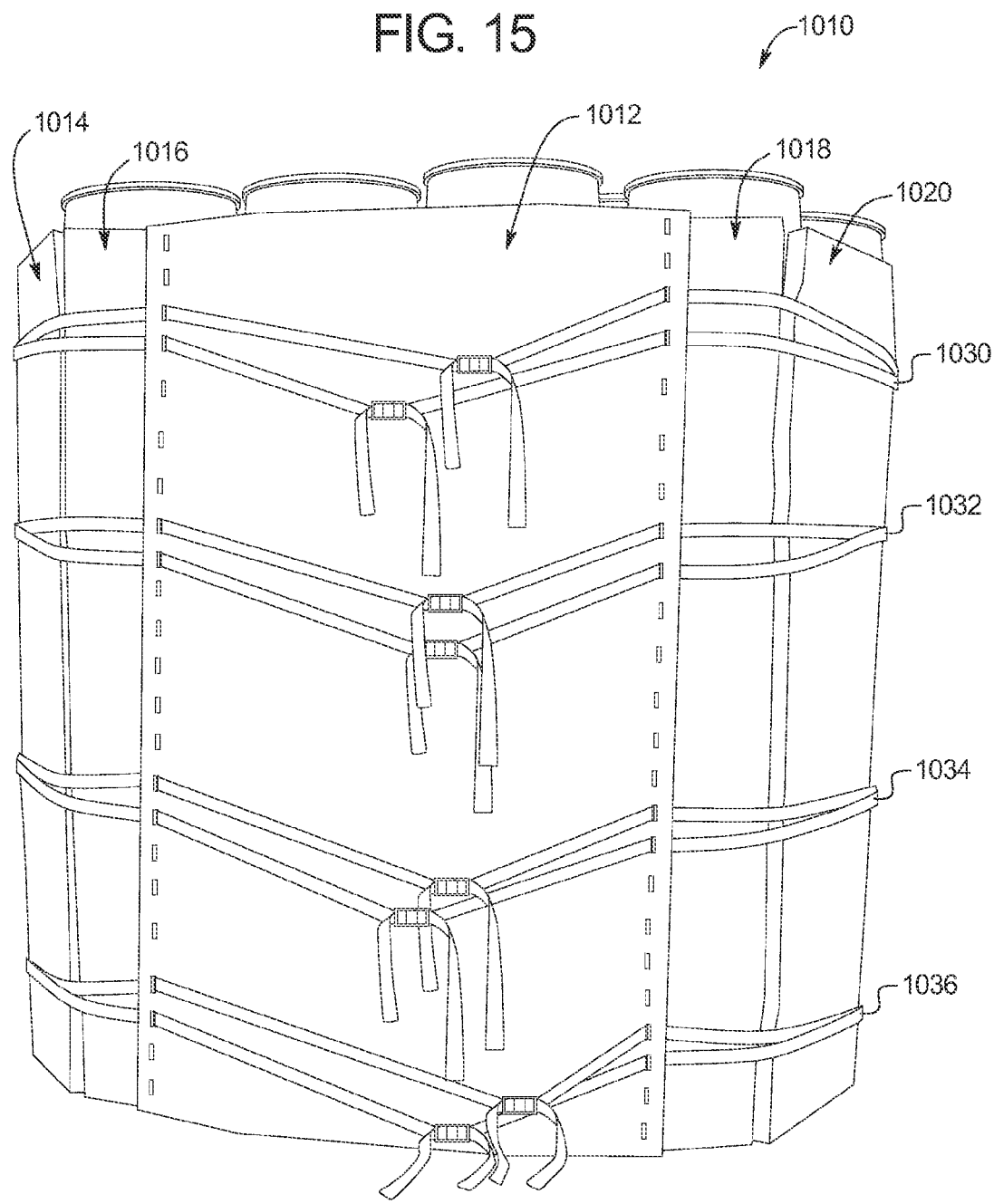
FIG. 15 is front perspective view of a plurality of cushioned pads and straps of another example embodiment of the present disclosure, wherein the straps extend through one of the cushioned pads, and where the load has moved and the cushioned pads are not positioned firmly against the load.

Turning now to FIG. 15, another example embodiment of the shock absorption and restraint apparatus of the present disclosure is illustrated and generally indicated by numeral 1010. In this example embodiment, the apparatus 1010 includes a connecting cushioned pad 1012, cooperating cushioned pads 1014, 1016, 1018, and 1020, and straps 1030, 1032, 1034, and 1036. Connecting cushioned pad 1012 also defines two series of aligned spaced apart strap receivers which each extend adjacent to each side of the cushioned pad. Each strap receiver in each series includes the walls of the cushioned pad which define an opening or hole through which one of the respective straps can extend through. The straps are threaded through the appropriate openings or holes on each side of the connecting pad 1012. In FIG. 15, the load (of drums) have shifted and less pressure is on the cushioned pads 1012, 1014, 1016, 1018, and 1020 and the straps 1030, 1032, 1034, and 1036. The strap engaging mechanisms or strap engagers allow the straps to drop down to a certain degree, but generally maintain the straps in relation to the pads. This prevents the straps from completely disengaging the pads. If the load shifts again, the straps will continue to maintain the cushioned pads against the load.

Figure 16:
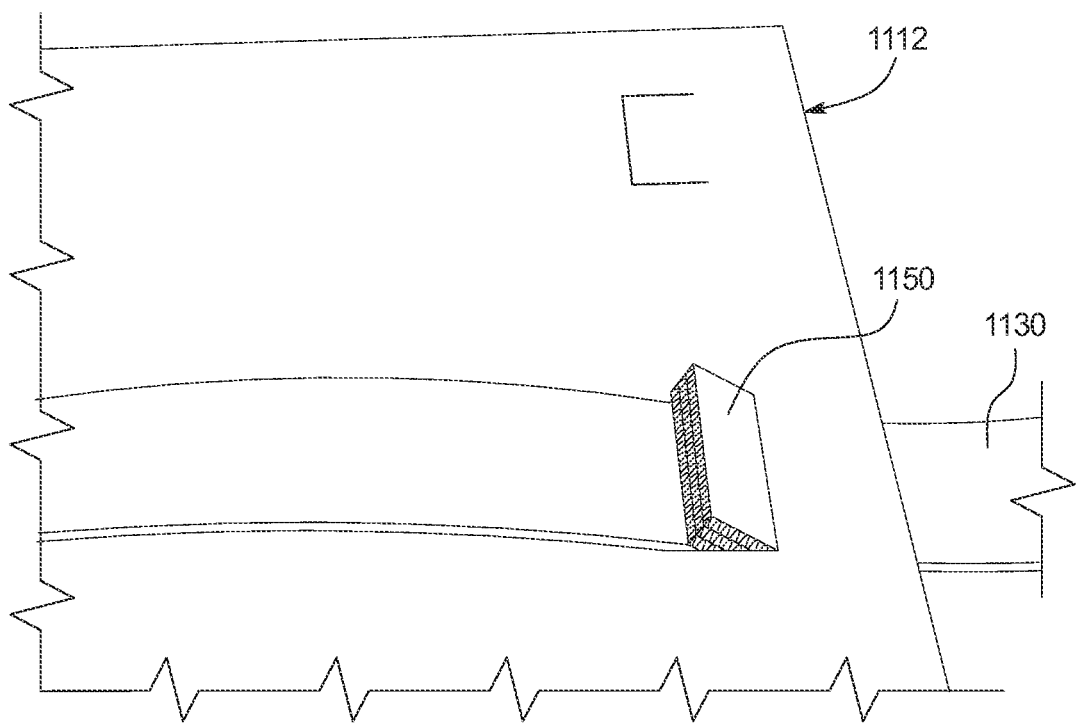
FIG. 16 is an enlarged fragmentary view of a cushioned pad of another embodiment of the present disclosure and a strap extending through one of the openings or holes in the cushioned pad.

It should be appreciated that the each strap engaging mechanism in each series in the pad can be formed in any one of a plurality of different ways. It the embodiments shown in FIGS. 14 and 15, each opening or hole can be made by cutting or stamping out an entire section of material of the cushioned pad. In other embodiments, such as shown in FIG. 16, each opening or hole can be made by cutting part of the material of the cushioned pad 1112, such that a section such as section 1150 remains hinged to the cushioned pad 1112. FIG. 16 illustrates a strap 1130 extending through one of the opening or holes in the cushioned pad 1112 and the section 1150 engaging the strap 1130. From these examples, it should be appreciated that the openings or holes can be formed in various different manners and the openings or holes can be made during forming of the cushioned pads or thereafter.

It should also be appreciated that the present disclosure contemplates that: (a) the openings or holes may be of different sizes; (b) the openings or holes may be of different shapes; (c) the openings or holes may be spaced apart differently or in different positions; and (d) different quantities of openings or holes may employed. It should also be appreciated that the present disclosure contemplates one or more of the cushioned pads may have these strap engaging mechanisms or strap engagers such as these strap receivers formed in the cushioned pads.

From the above example embodiments, it should be appreciated that one or more of the cushioned pads can include suitable contours, wedges and sections specifically configured to engage the shape of the products of the load. It should thus be appreciated from these example embodiments that the plurality of cushioned pads of the present disclosure are configured to hold, secure and prevent damage to a variety of different size and shape loads and that the number, size and configuration of the connector and cooperating cushioned pads can vary in accordance with the present disclosure.

It should be appreciated from the above example embodiments that the cushioned pads of the present disclosure can be configured to fold or bend where needed to wrap around the products of the load and to evenly distribute the securing forces of the straps securing the load.

As indicated above, the cushioned pads are made from a foam material in certain embodiments. It should further be appreciated that the cushioned pads can be made from any suitable material that provides the degree of cushion and shape or rigidity needed to confirm to and secure the load. For example, in one embodiment, the cushioned pads are made from lightweight materials, such as corrugated paper with the desired degree of cushion, shape and rigidity. In certain embodiments, one or more of the pads are each formed of one or more composite panels having a honeycomb core.

As also indicated above, certain embodiments of the strap engager is made from a nylon material in certain embodiments. It should be appreciated that the strap engager can be made from any suitable material such as any suitable flexible material (such as rayon, cotton, or hemp) that can be formed to engage the straps that secure the load. It should further be appreciated from the above that the strap engager can be made from the same material as the cushioned pads.

As further indicated above, the straps are each made from a nylon material in certain embodiments. It should be appreciated that the straps can be made from any suitable material such as any suitable flexible material (such as rayon, cotton, or hemp) that can be formed to engage the pads and secure the load. It should also be appreciated that the straps can include one or more buckles, hooks, or other devices to facilitate attachment and operation of the straps.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A railroad car shock absorption and restraint apparatus comprising:
    at least three co-acting cushioned pads, each cushioned pad including a load engaging surface, a strap engaging surface, a bottom edge, a top edge, a right side edge, and a left side edge, said cushioned pads configurable such that the left side edge of a first one of the cushioned pads is adjacent to the right side edge of a second one of the cushioned pads, and the left side edge of the second one of the cushioned pads is adjacent to the right side edge of a third one of the cushioned pads to create a protective shock absorbing barrier for a load in a railroad car;
    at least one strap engager attached to one of the cushioned pads; and
    a plurality of straps employable to restrain the cushioned pads and the load, said straps attachable to a plurality of walls of the railroad car.

2. The railroad car shock absorption and restraint apparatus of claim 1, wherein at least one of the strap engagers extends outwardly from an exterior surface of said one of the cushioned pads.

3. The railroad car shock absorption and restraint apparatus of claim 1, wherein each cushioned pad is made from foam material and has a smooth load engaging surface.

4. The railroad car shock absorption and restraint apparatus of claim 3, wherein at least two of the cushioned pads are connected by at least one hinge.

5. The railroad car shock absorption and restraint apparatus of claim 1, wherein at least two of the cushioned pads are connected by at least one hinge.

\* \* \* \* \*

UNITED STATES PATENT AND TRADEMARK OFFICE
CERTIFICATE OF CORRECTION

PATENT NO. : 8,727,682 B2
APPLICATION NO. : 13/308648
DATED : May 20, 2014
INVENTOR(S) : Marc Steven Johnson et al.

Page 1 of 1

It is certified that error appears in the above-identified patent and that said Letters Patent is hereby corrected as shown below:

IN THE CLAIMS

In Claim 2, Column 12, Line 30, between "the" and "strap" insert --at least one--.
In Claim 2, Column 12, Line 30, replace "engagers" with --engager--.

Signed and Sealed this
Twelfth Day of August, 2014

Michelle K. Lee
*Deputy Director of the United States Patent and Trademark Office*